United States Patent
Von Arb

(10) Patent No.: US 10,107,417 B2
(45) Date of Patent: Oct. 23, 2018

(54) SINGLE-PIECE VALVE CLOSURE MEMBERS HAVING INTEGRAL FLOW PATHS FORMED VIA ADDITIVE MANUFACTURING

(71) Applicant: Fisher Controls International LLC, Mashalltown, IA (US)

(72) Inventor: Jeffrey Michael Von Arb, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/378,726

(22) Filed: Dec. 14, 2016

(65) Prior Publication Data

US 2018/0163898 A1    Jun. 14, 2018

(51) Int. Cl.
  *F16K 49/00*    (2006.01)
  *F16K 1/22*    (2006.01)
  (Continued)

(52) U.S. Cl.
  CPC .......... *F16K 49/007* (2013.01); *B23P 15/001* (2013.01); *B33Y 10/00* (2014.12);
  (Continued)

(58) Field of Classification Search
  CPC ..... F16K 49/005; F16K 49/007; B33Y 80/00; B33Y 10/00; B23P 15/001; Y10T 137/6552
  (Continued)

(56) References Cited

U.S. PATENT DOCUMENTS

| 103,773 | A | * | 5/1870 | Pfleger | .................. | B62D 5/097 |
| | | | | | | 137/625.24 |
| 136,622 | A | * | 3/1873 | Shellenback | .......... | B62D 5/097 |
| | | | | | | 137/625.24 |

(Continued)

FOREIGN PATENT DOCUMENTS

| DE | 2638602 | | 3/1978 | | |
| DE | 19527285 | A1 * | 1/1997 | ................ | F01L 3/12 |

(Continued)

OTHER PUBLICATIONS

Score Energy Product Inc., "Jacketed Body, Traced Shaft, Traced Disc, Purged/Lubricated Bearings & Packing and Purged Seat & Seal," Technical Bulletin 105, date unknown, received Dec. 5, 2016, 4 pages.

(Continued)

*Primary Examiner* — Reinaldo Sanchez-Medina
*Assistant Examiner* — David Colon Morales
(74) *Attorney, Agent, or Firm* — Hanley, Flight & Zimmerman, LLC

(57) ABSTRACT

Single-piece valve closure members (e.g., discs, plugs, balls, etc.) including integral flow paths formed via additive manufacturing processes are disclosed. In some examples, an apparatus includes a single-piece valve closure member. In some examples of the apparatus, the single-piece valve closure member includes an integral flow path to direct a flow of fluid within the valve closure member. In some examples, a method includes forming, via an additive manufacturing process, a single-piece valve closure member. In some examples of the method, the single-piece valve closure member includes an integral flow path to direct a flow of fluid within the valve closure member.

20 Claims, 7 Drawing Sheets

SECTION A-A

(51) Int. Cl.
*B33Y 80/00* (2015.01)
*B23P 15/00* (2006.01)
*B33Y 10/00* (2015.01)

(52) U.S. Cl.
CPC .............. *B33Y 80/00* (2014.12); *F16K 1/22* (2013.01); *F16K 49/005* (2013.01); *Y10T 137/6552* (2015.04)

(58) Field of Classification Search
USPC ....................................................... 137/339
See application file for complete search history.

(56) References Cited

U.S. PATENT DOCUMENTS

| | | | | |
|---|---|---|---|---|
| 267,234 | A * | 11/1882 | Long | F16K 49/007 137/340 |
| 300,602 | A * | 6/1884 | Hanlon | F16K 49/007 137/340 |
| 320,252 | A * | 6/1885 | Hey | B62D 5/097 137/625.24 |
| 464,195 | A * | 12/1891 | Foster | F16K 49/007 137/340 |
| 473,953 | A * | 5/1892 | Patte | B62D 5/097 137/625.24 |
| 474,227 | A * | 5/1892 | Dexter | F16K 49/007 137/340 |
| 541,990 | A * | 7/1895 | Christie | F16K 49/007 137/340 |
| 619,594 | A * | 2/1899 | Martin | B62D 5/097 137/625.24 |
| 722,419 | A * | 3/1903 | Brunt | B62D 5/097 137/625.24 |
| 948,571 | A * | 2/1910 | Arp | B62D 5/097 137/625.21 |
| 958,451 | A * | 5/1910 | Washington | F16K 5/12 137/625.12 |
| 2,446,196 | A * | 8/1948 | Sitney | B63H 21/32 137/340 |
| 3,266,517 | A * | 8/1966 | Carr | C21B 9/12 137/340 |
| 3,831,622 | A * | 8/1974 | Grewer | F16K 49/007 137/340 |
| 3,941,186 | A * | 3/1976 | Schneider | F16K 49/007 165/47 |
| 4,161,959 | A * | 7/1979 | Jansen | F16K 49/005 137/340 |
| 4,195,655 | A * | 4/1980 | Augsburger | F16K 49/005 137/334 |
| 4,262,638 | A * | 4/1981 | Coulin | F01L 3/18 123/41.41 |
| 4,535,801 | A * | 8/1985 | Neale | F16K 3/0227 134/166 C |
| 4,688,594 | A | 8/1987 | Gardner et al. | |
| 4,715,400 | A * | 12/1987 | Gardner | F16K 1/2263 137/340 |
| 4,809,948 | A | 3/1989 | Gardner et al. | |
| 5,642,751 | A * | 7/1997 | Crawley | B65D 90/582 137/340 |
| 5,706,851 | A * | 1/1998 | Lopez-Gomez | F16K 5/0407 137/246.22 |
| 6,050,289 | A * | 4/2000 | Flores-Verdugo | F16K 5/20 137/340 |
| 8,256,448 | B2 * | 9/2012 | Steele | F16K 1/2265 137/240 |
| 9,133,960 | B2 * | 9/2015 | Lucas | F16K 49/00 |
| 9,683,678 | B2 * | 6/2017 | Army, Jr. | F16K 49/007 |
| 2016/0169062 | A1 * | 6/2016 | Knudsen | F01L 3/02 137/15.18 |
| 2016/0281865 | A1 | 9/2016 | Morgan et al. | |
| 2017/0045155 | A1 * | 2/2017 | Army, Jr. | F16K 49/007 |

FOREIGN PATENT DOCUMENTS

| | | |
|---|---|---|
| GB | 2510498 | 8/2014 |
| WO | 2014170209 | 10/2014 |
| WO | 2015150479 | 10/2015 |

OTHER PUBLICATIONS

International Searching Authority, "International Search Report and Written Opinion," issued in connection with International Patent Application No. PCT/US2017/064810, dated Mar. 29, 2018, 13 pages.

* cited by examiner

SECTION A-A

SECTION B-B

SECTION C-C

SECTION D-D

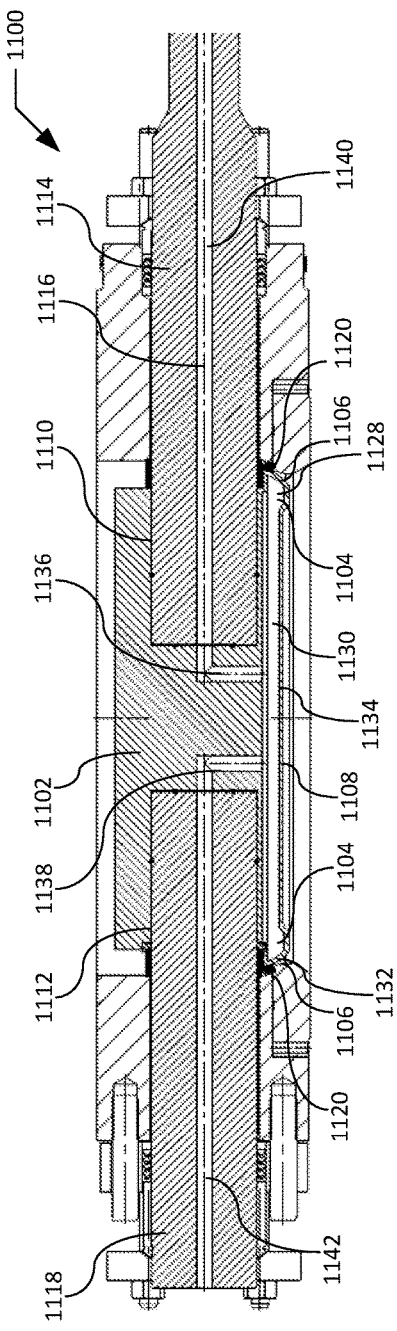
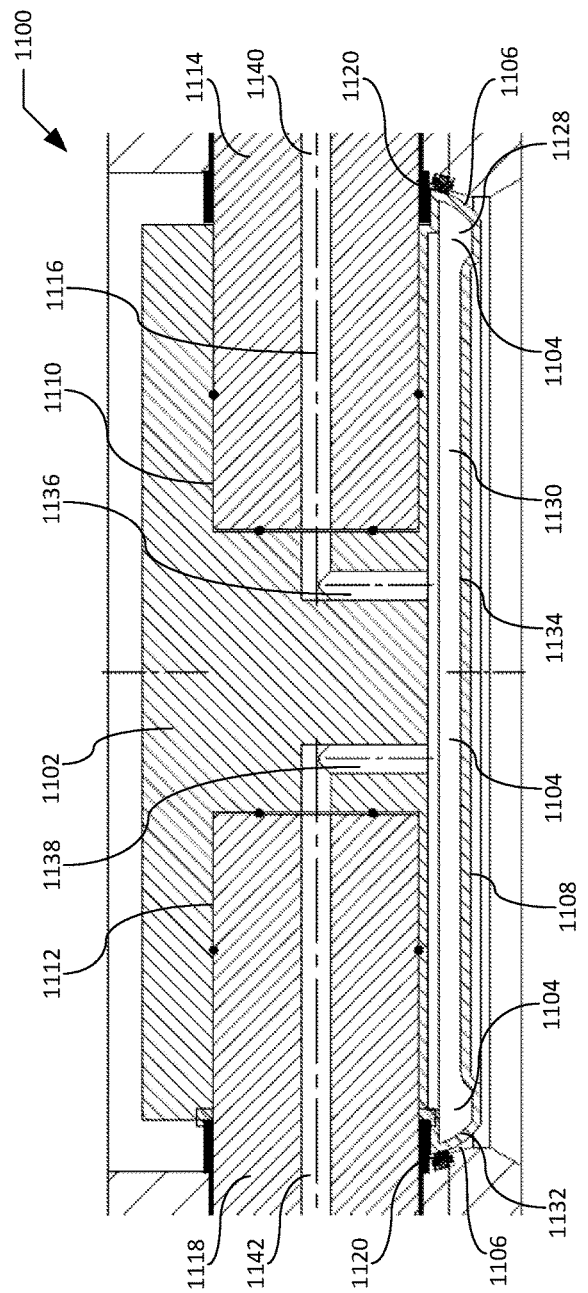
FIG. 11
FIG. 12

SINGLE-PIECE VALVE CLOSURE MEMBERS HAVING INTEGRAL FLOW PATHS FORMED VIA ADDITIVE MANUFACTURING

FIELD OF THE DISCLOSURE

This disclosure relates generally to valve closure members and, more specifically, to single-piece valve closure members having integral flow paths formed via additive manufacturing.

BACKGROUND

Certain valve applications require heating or cooling of the valve trim. For example, heating of the valve trim may be necessary to reduce and/or prevent fluid crystallization and/or freezing on wetted surfaces of the valve trim. Such valve applications are common for processes containing Sulfur or resins, as is common in the chemical, pulp and paper industries.

Conventional steam-traced valve closure members (e.g., discs, plugs, balls, etc.) include one or more flow path(s) configured to receive thermal fluid (e.g., steam) to control a temperature of one or more portion(s) of the valve closure member. Circulation of the thermal fluid through the flow path(s) may reduce and/or prevent fluid crystallization and/or freezing at the valve closure member, and/or at a junction between the valve closure member and a valve seat with which the valve closure member mates. Conventional steam-traced valve closure members are fabricated from multiple pieces of material that are welded or otherwise fastened together by mechanical means.

SUMMARY

Apparatus comprising single-piece valve closure members (e.g., discs, plugs, balls, etc.) including integral flow paths formed via additive manufacturing processes are disclosed herein. In some disclosed examples, an apparatus comprises a single-piece valve closure member. In some disclosed examples, the single-piece valve closure member includes an integral flow path to direct a flow of fluid within the valve closure member.

Methods for forming single-piece valve closure members (e.g., discs, plugs, balls, etc.) including integral flow paths formed via additive manufacturing processes are also disclosed herein. In some disclosed examples, a method comprises forming, via an additive manufacturing process, a single-piece valve closure member. In some disclosed examples, the single-piece valve closure member includes an integral flow path to direct a flow of fluid within the valve closure member.

BRIEF DESCRIPTION OF THE DRAWINGS

FIG. 11 is a cross-sectional view of a second example butterfly valve having a fourth example single-piece valve closure member including a fourth example integral flow path formed via an additive manufacturing process.

FIG. 12 is an enlarged cross-sectional view of the fourth example single-piece valve closure member of FIG. 11.

Figure 1:
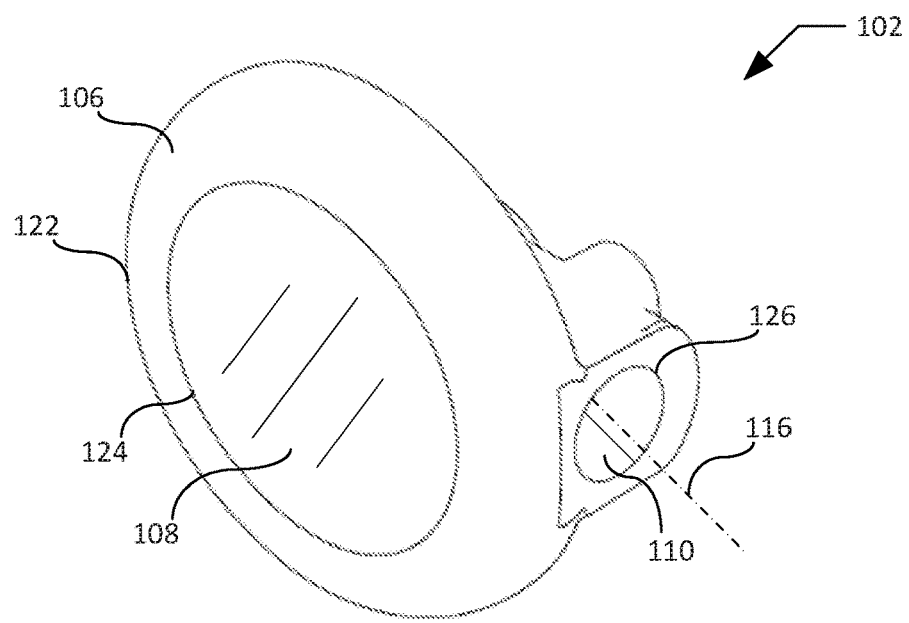
FIG. 1 is a perspective view of a first example single-piece valve closure member including a first example integral flow path formed via an additive manufacturing process.

Certain examples are shown in the above-identified figures and described in detail below. In describing these examples, like or identical reference numbers are used to identify the same or similar elements. The figures are not necessarily to scale and certain features and certain views of the figures may be show n exaggerated in scale or in schematic for clarity and/or conciseness.

DETAILED DESCRIPTION

Conventional steam-traced valve closure members including one or more flow path(s) configured to receive thermal fluid (e.g., steam) are fabricated from multiple pieces of material that are welded or otherwise fastened together by mechanical means. The multi-piece construction and/or manufacturing of such conventional steam-traced valve closure members is complicated and gives rise to numerous manufacturing and performance concerns.

As one example, the joints between different pieces of a multi-piece steam-traced valve closure assembly must be properly sealed (e.g., via welding or resilient seals) to prevent the formation of leak paths. If a joint of the multi-piece steam-traced valve closure assembly leaks, thermal fluid circulating through a flow path of the valve closure member may contaminate the process fluid, or the process fluid may contaminate the thermal fluid.

As another example, a conventional multi-piece steam-traced valve closure member typically has an outer geometry that, as a result of the aforementioned joint welds and/or joint seals, is altered and/or modified relative to that of a corresponding standard valve closure member (e.g., a valve closure member of the same size and shape that is not of the steam-traced variety). As a result of its altered and/or modified outer geometry, the multi-piece steam-traced valve closure member has flow characteristics that differ from those of the corresponding standard valve closure member.

Unlike the conventional multi-piece steam-traced valve closure members described above, the single-piece valve closure members disclosed herein include integral flow paths formed via additive manufacturing processes. As used herein in reference to a component (e.g., a valve closure member), the term "single-piece" refers generally to a unitary, one-piece component that is free of joints held together and/or sealed via welding or other mechanical fastening and/or sealing means. As used herein, the term "additive manufacturing" refers generally to a process by which three-dimensional design data (e.g., a computer-aided design (CAD) file) is used in conjunction with a controllable laser to fabricate a single-piece component by depositing successive layers of material on top of one another. For example, rather than milling and/or machining a component from a solid block of material, additive manufacturing fabricates the component layer by layer using one or more material(s) in the form of a fine powder (e.g., a metallic powder, a plastic powder, a composite powder, etc.) capable of being solidified by application of the laser thereto.

Additive manufacturing of the disclosed single-piece valve closure members eliminates the above-described joints present in conventional multi-piece steam-traced valve closure members, and accordingly eliminates the risk of leak formation attributable to failure to properly seal such joints. As a result of the above-described joint welds and/or joint seals being eliminated, the disclosed single-piece valve closure members have outer geometries that are not altered or modified relative to those of corresponding ones of standard valve closure members (e.g., a valve closure member of the same size and shape that is not of the steam-traced variety). Therefore, the flow characteristics of the disclosed single-piece valve closure members are substantially identical to those of corresponding ones of standard valve closure members.

Additive manufacturing of the disclosed single-piece valve closure members advantageously enables unrestricted integral flow path and/or integral flow cavity geometry that can be optimized for application-specific heating or cooling characteristics. For example, one or more integral flow paths and/or integral flow cavities of the single-piece valve closure member can be fabricated to closely follow any surface of the valve closure member where heating or cooling is desirable (e.g., a sealing surface of the valve closure member, a face of the valve closure member, etc.). In this regard, additive manufacturing enables the integral formation of complex flow path and/or flow cavity geometries within a valve closure member that would be prohibitively difficult, if not impossible, to form via conventional multi-piece fabrication processes.

Figure 2:
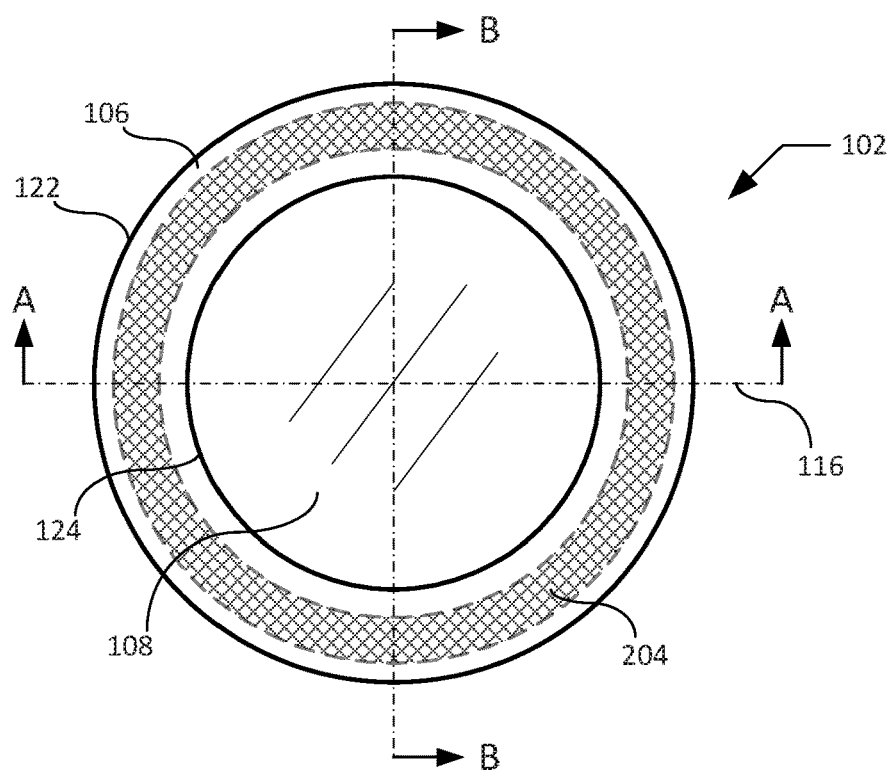
FIG. 2 is a face-side plan view of the first example single-piece valve closure member of FIG. 1.
Figure 3:
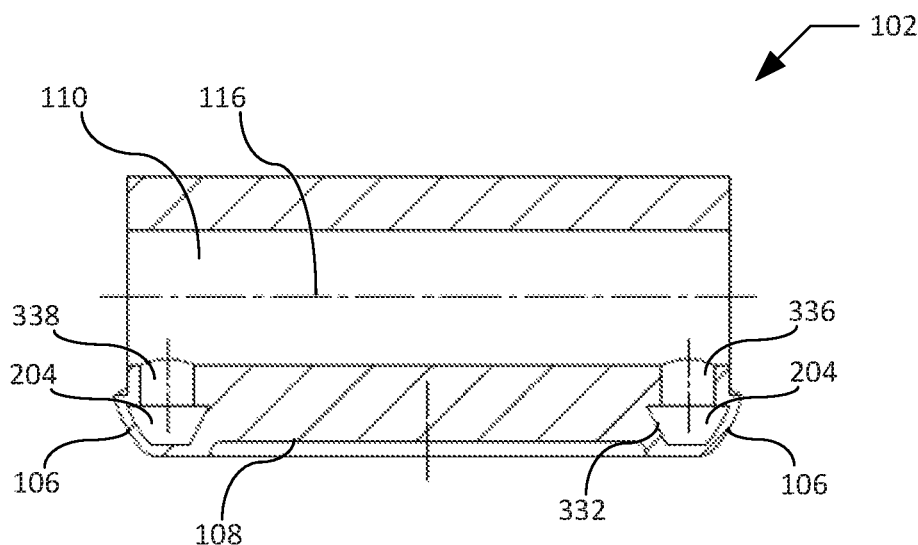
FIG. 3 is a cross-sectional view of the first example single-piece valve closure member of FIGS. 1 and 2 taken along line A-A of FIG. 2.
Figure 4:
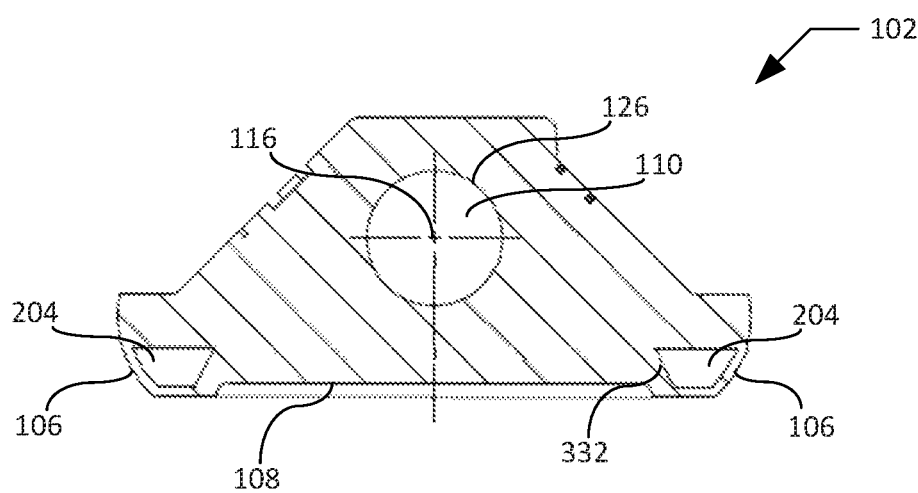
FIG. 4 is a cross-sectional view of the first example single-piece valve closure member of FIGS. 1-3 taken along line B-B of FIG. 2.

FIG. 1 is a perspective view of a first example single-piece valve closure member 102 including a first example integral flow path (shown as item 204 of FIGS. 2-4) formed via an additive manufacturing process. FIG. 2 is a face-side plan view of the first example single-piece valve closure member 102 of FIG. 1. FIG. 3 is a cross-sectional view of the first example single-piece valve closure member 102 of FIGS. 1 and 2 taken along line A-A of FIG. 2. FIG. 4 is a cross-sectional view of the first example single-piece valve closure member 102 of FIGS. 1-3 taken along line B-B of FIG. 2.

As shown in FIGS. 1-4, the single-piece valve closure member 102 includes an example sealing surface 106, an example face 108, and an example bore 110. The sealing surface 106 forms a perimeter around the face 108. When the single-piece valve closure member 102 is implemented in a valve (not shown), the sealing surface 106 and/or the face 108 of the single-piece valve closure member 102 may be exposed to process fluid flowing through the valve. The illustrated bore 110 is to receive a shaft (not shown) of the valve. In other examples, the bore 110 may be configured to receive more than one shaft. In still other examples, the single-piece valve closure member 102 may include multiple bores configured to receive corresponding shafts. In the illustrated example of FIGS. 1-4, the shaft is to rotate about an example longitudinal axis 116 defined by the bore 110 to position the single-piece valve closure member 102 within the valve. When the single-piece valve closure member 102 is in a closed position, one or more portion(s) of the sealing surface 106 mate(s) with (e.g., forms a seal with) a seat (not shown) of the valve.

As shown in FIGS. 1 and 2, each of the sealing surface 106, the face 108 and the bore 110 of the single-piece valve closure member 102 has a profile that is circular in shape. In the illustrated example, a first example circular-shaped profile 122 of the sealing surface 106 is concentric with a second example circular-shaped profile 124 of the face 108. The first circular-shaped profile 122 of the sealing surface 106 lies in a plane that is substantially parallel to a plane of the second circular-shaped profile 124 of the face 108. A third example circular-shaped profile 126 of the bore 110 lies in a plane that is substantially perpendicular to the plane of the second circular-shaped profile 124 of the face 108. The sealing surface 106, the face 108 and/or the bore 110 may be of a size, shape, configuration and/or orientation differing from the size, shape, configuration and/or orientation shown in FIGS. 1-4.

As shown in phantom in FIG. 2 and further shown in FIGS. 3 and 4, the integral flow path 204 of the single-piece valve closure member 102 of FIGS. 1-4 is formed within the single-piece valve closure member 102 adjacent the sealing surface 106 of the single-piece valve closure member 102. As shown in FIG. 2, the integral flow path 204 traces and/or tracks the entirety of first circular-shaped profile 122 of the sealing surface 106. In some examples, the integral flow path 204 may trace and/or track one or more portion(s) of the first circular-shaped profile 122 of the sealing surface 106 without tracing and/or tracking the entirety of the first circular-shaped profile 122 of the sealing surface 106. In some examples, the integral flow path 204 may define a path of a size, shape, orientation and/or configuration differing from the size, shape, orientation and/or configuration of the path shown in FIG. 2.

As shown in FIGS. 3 and 4, the integral flow path 204 has an example trapezoidal cross-sectional area 332 formed such that portions of the integral flow path 204 are adjacent corresponding portions of the sealing surface 106 of the single-piece valve closure member 102. In some examples, the integral flow path 204 may have a cross-sectional area of a size, shape, orientation and/or configuration differing from the size, shape, orientation and/or configuration of the trapezoidal cross-sectional area 332 shown in FIGS. 3 and 4. For example, the integral flow path 204 may have a cross-sectional area that is circular, elliptical, triangular, rectangular, or irregular in shape. In some examples, the cross-sectional area of the integral flow path 204 may change (e.g., in size or shape) at different locations along the integral flow path 204.

As further shown in FIG. 3, the integral flow path 204 is in fluid communication with an example fluid inlet 336 and an example fluid outlet 338, both of which are integrally formed within the single-piece valve closure member 102 via the additive manufacturing process. The fluid inlet 336 and the fluid outlet 338 may be of any size, shape, configuration and/or orientation, and may be positioned at any location relative to the integral flow path 204. In the illustrated example, the one or more shaft(s) (not shown) to be received in the bore 110 include one or more core(s) that define one or more corresponding flow path(s) to be positioned in fluid communication with the fluid inlet 336 and the fluid outlet 338 of the single-piece valve closure member 102 when the shaft(s) is/are coupled to the single-piece valve closure member 102. A thermal fluid flowing though the core(s) and/or flow path(s) of the shaft is received at the fluid inlet 336 of the single-piece valve closure member 102, circulated through the integral flow path 204 of the single-piece valve closure member 102, and exhausted and/or dispensed at the fluid outlet 338 of the single-piece valve closure member 102. As a result of the integral flow path 204 being formed adjacent the sealing surface 106 of the single-piece valve closure member 102, circulation of the thermal fluid through the integral flow path 204 of the single-piece valve closure member 102 may control a temperature of the sealing surface 106 of the single-piece valve closure member 102.

Although the first example single-piece valve closure member 102 of FIGS. 1-4 is configured to be implemented in a rotary butterfly valve, one or more structure(s) of the single-piece valve closure member 102 may be modified such that the single-piece valve closure member 102 is to be implemented in a different type of rotary valve (e.g., a full ball valve, a segmented ball valve, a plug valve, etc.), or in a non-rotary type of valve (e.g., a sliding-stem valve, a linear valve, an angle valve, a globe valve, etc.). For example, the orientation of the bore 110 of the single-piece valve closure member 102 of FIGS. 1-4 may be modified such that the third example circular-shaped profile 126 of the bore 110 of FIGS. 1-4 lies in a plane that is substantially parallel to the plane of the second circular-shaped profile 124 of the face 108 of the single-piece valve closure member 102 of FIGS. 1-4.

The first example single-piece valve closure member 102 of FIGS. 1-4 is formed and/or fabricated via one or more additive manufacturing process(es). For example, an additive manufacturing process for forming the single-piece valve closure member 102 of FIGS. 1-4 may begin by forming one or more first layer(s) of material that define the sealing surface 106 and/or the face 108 of the single-piece valve closure member 102. The additive manufacturing process may next form one or more second layers(s) of material that define the integral flow path 204 within the single-piece valve closure member 102 adjacent the sealing surface 106 of the single-piece valve closure member 102. The additive manufacturing process may then continue forming one or more third layer(s) of material of the single-piece valve closure member 102 until fabrication of the single-piece valve closure member 102 is complete (e.g., when the formed single-piece valve closure member 102 fully matches a CAD rendering of the single-piece valve closure member 102). The formation of the third layer(s) of material defines the bore 110, the fluid inlet 336, and the fluid outlet 338 of the single-piece valve closure member 102 of FIGS. 1-4, each of which is integrally formed within the single-piece valve closure member 102 along with the integral flow path 204 via the additive manufacturing process. In some examples, the above-described additive manufacturing process for forming the single-piece valve closure member 102 of FIGS. 1-4 may be modified (e.g., reversed) such that the sealing surface 106 and/or the face 108 is/are the final components of the single-piece valve closure member 102 to be formed via the additive manufacturing process.

Figure 5:
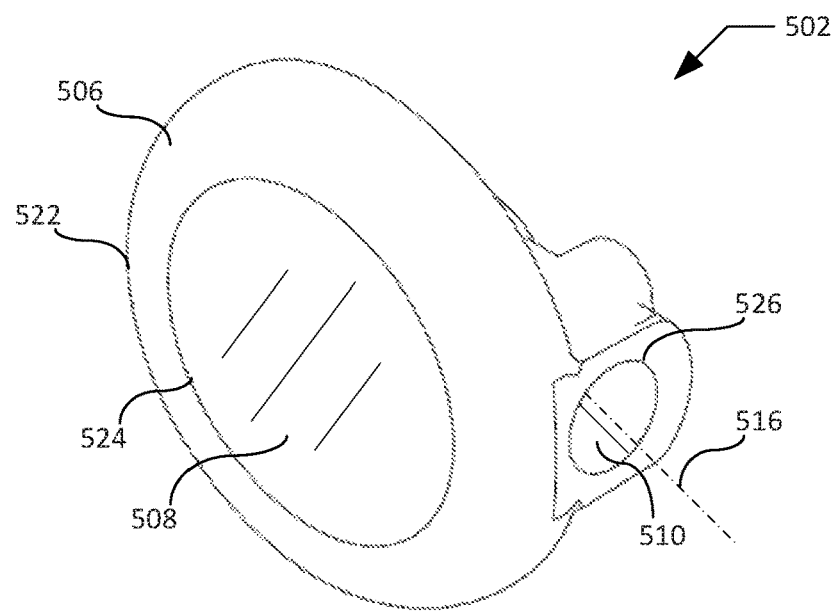
FIG. 5 is a perspective view of a second example single-piece valve closure member including a second example integral flow path formed via an additive manufacturing process.
Figure 6:
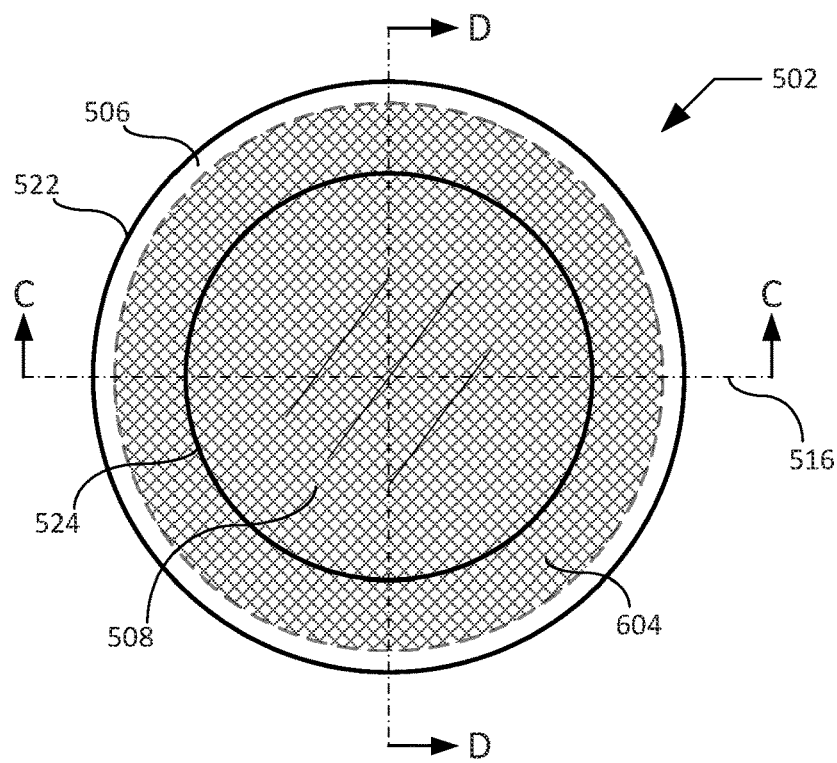
FIG. 6 is a face-side plan view of the second example single-piece valve closure member of FIG. 5.
Figure 7:
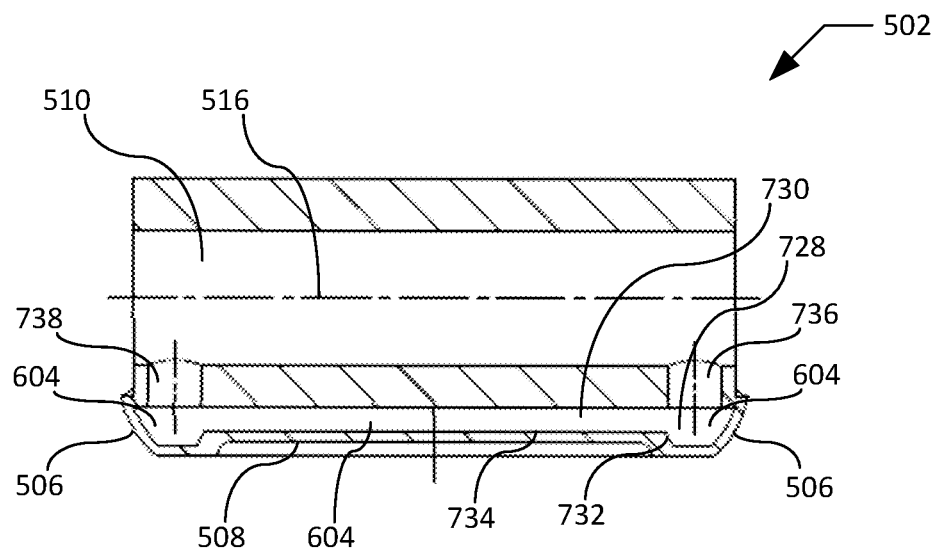
FIG. 7 is a cross-sectional view of the second example single-piece valve closure member of FIGS. 5 and 6 taken along line C-C of FIG. 6.
Figure 8:
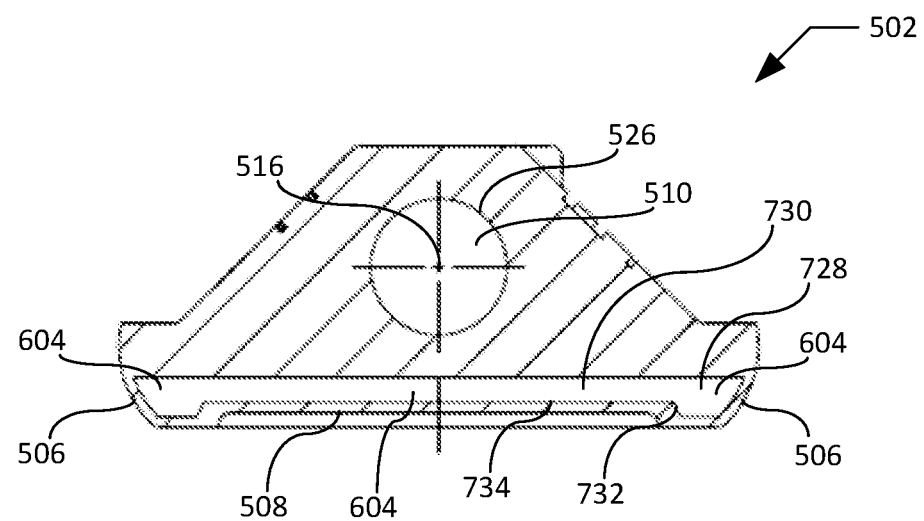
FIG. 8 is a cross-sectional view of the second example single-piece valve closure member of FIGS. 5-7 taken along line D-D of FIG. 6.

FIG. 5 is a perspective view of a second example single-piece valve closure member 502 including a second example integral flow path (shown as item 604 of FIGS. 6-8) formed via an additive manufacturing process. FIG. 6 is a face-side plan view of the second example single-piece valve closure member 502 of FIG. 5. FIG. 7 is a cross-sectional view of the second example single-piece valve closure member 502 of FIGS. 5 and 6 taken along line C-C of FIG. 6. FIG. 8 is a cross-sectional view of the second example single-piece valve closure member 502 of FIGS. 5-7 taken along line D-D of FIG. 6.

As shown in FIGS. 5-8, the single-piece valve closure member 502 includes an example sealing surface 506, an example face 508, and an example bore 510. The sealing surface 506 forms a perimeter around the face 508. When the single-piece valve closure member 502 is implemented in a valve (not shown), the sealing surface 506 and/or the face 508 of the single-piece valve closure member 502 may be exposed to process fluid flowing through the valve. The illustrated bore 510 is to receive a shaft (not shown) of the valve. In other examples, the bore 510 may be configured to receive more than one shaft. In still other examples, the single-piece valve closure member 502 may include multiple bores configured to receive corresponding shafts. In the illustrated example of FIGS. 5-8, the shaft is to rotate about an example longitudinal axis 516 defined by the bore 510 to position the single-piece valve closure member 502 within the valve. When the single-piece valve closure member 502 is in a closed position, one or more portion(s) of the sealing surface 506 mate(s) with (e.g., forms a seal with) a seat (not shown) of the valve.

As shown in FIGS. 5 and 6, each of the sealing surface 506, the face 508 and the bore 510 of the single-piece valve closure member 502 has a profile that is circular in shape. In the illustrated example, a first example circular-shaped profile 522 of the sealing surface 506 is concentric with a second example circular-shaped profile 524 of the face 508. The first circular-shaped profile 522 of the sealing surface 506 lies in a plane that is substantially parallel to a plane of the second circular-shaped profile 524 of the face 508. A third example circular-shaped profile 526 of the bore 510 lies in a plane that is substantially perpendicular to the plane of the second circular-shaped profile 524 of the face 508. The sealing surface 506, the face 508 and/or the bore 510 may be of a size, shape, configuration and/or orientation differing from the size, shape, configuration and/or orientation shown in FIGS. 5-8.

As shown in phantom in FIG. 6 and further shown in FIGS. 7 and 8, the integral flow path 604 of the single-piece valve closure member 502 of FIGS. 5-8 is formed within the single-piece valve closure member 502 adjacent the sealing surface 506 and adjacent the face 508 of the single-piece valve closure member 502. As shown in FIG. 6, the integral flow path 604 traces and/or tracks the entirety of first circular-shaped profile 522 of the sealing surface 506 and the entirety of the second circular-shaped profile 524 of the face 508. In some examples, the integral flow path 604 may trace and/or track one or more portion(s) of the first circular-shaped profile 522 of the sealing surface 506 and/or one or more portion(s) of the second circular-shaped profile 524 of the face 508 without tracing and/or tracking the entirety of the first circular-shaped profile 522 of the sealing surface 506 and/or the entirety of the second circular-shaped profile 524 of the face 508. In some examples, the integral flow path 604 may define a path of a size, shape, orientation and/or configuration differing from the size, shape, orientation and/or configuration of the path shown in FIG. 6.

As shown in FIGS. 7 and 8, the integral flow path 604 has an example sealing-surface portion 728 and an example face portion 730. The sealing-surface portion 728 of the integral flow path 604 has an example trapezoidal cross-sectional area 732 formed such that portions of the integral flow path 604 are adjacent corresponding portions of the sealing surface 506 of the single-piece valve closure member 502. The face portion 730 of the integral flow path 604 has an example rectangular cross-sectional area 734 formed such that a portion of the integral flow path 604 is adjacent a portion of the face 508 of the single-piece valve closure member 502. In some examples, the integral flow path 604 may include one or more portion(s) having a cross-sectional area of a size, shape, orientation and/or configuration differing from the size, shape, orientation and/or configuration of the trapezoidal cross-sectional area 732 of the sealing-surface portion 728 and/or the rectangular cross-sectional area 734 of the face portion 730 shown in FIGS. 7 and 8. For example, the integral flow path 604 may include a sealing-surface portion having cross-sectional area that is circular, elliptical, triangular, rectangular, or irregular in shape. As another example, the integral flow path 604 may include a face portion having a cross-sectional area that is circular, elliptical, triangular, trapezoidal, or irregular in shape. In some examples, the cross-sectional area(s) of the integral flow path 604 may change (e.g., in size or shape) at different locations along the integral flow path 604.

As further shown in FIG. 7, the integral flow path 604 is in fluid communication with an example fluid inlet 736 and an example fluid outlet 738, both of which are integrally formed within the single-piece valve closure member 502 via the additive manufacturing process. The fluid inlet 736 and the fluid outlet 738 may be of any size, shape, configuration and/or orientation, and may be positioned at any location relative to the integral flow path 604. In the illustrated example, the one or more shaft(s) (not shown) to be received in the bore 510 include one or more core(s) that define one or more corresponding flow path(s) to be positioned in fluid communication with the fluid inlet 736 and the fluid outlet 738 of the single-piece valve closure member 502 when the shaft(s) is/are coupled to the single-piece valve closure member 502. A thermal fluid flowing though the core(s) and/or flow path(s) of the shaft is received at the fluid inlet 736 of the single-piece valve closure member 502, circulated through the integral flow path 604 of the single-piece valve closure member 502, and exhausted and/or dispensed at the fluid outlet 738 of the single-piece valve closure member 502. As a result of the integral flow path 604 being formed adjacent the sealing surface 506 and the face 508 of the single-piece valve closure member 502, circulation of the thermal fluid through the integral flow path 604 of the single-piece valve closure member 502 may control a temperature of the sealing surface 506 of the single-piece valve closure member 502 and/or a temperature of the face 508 of the single-piece valve closure member 502.

Although the second example single-piece valve closure member 502 of FIGS. 5-8 is configured to be implemented in a rotary butterfly valve, one or more structure(s) of the single-piece valve closure member 502 may be modified such that the single-piece valve closure member 502 is to be implemented in a different type of rotary valve (e.g., a full ball valve, a segmented ball valve, a plug valve, etc.), or in a non-rotary type of valve (e.g., a sliding-stem valve, a linear valve, an angle valve, a globe valve, etc.). For example, the orientation of the bore 510 of the single-piece valve closure member 502 of FIGS. 5-8 may be modified such that the third example circular-shaped profile 526 of the bore 510 of FIGS. 5-8 lies in a plane that is substantially parallel to the plane of the second circular-shaped profile 524 of the face 508 of the single-piece valve closure member 502 of FIGS. 5-8.

The second example single-piece valve closure member 502 of FIGS. 5-8 is formed and/or fabricated via one or more additive manufacturing process(es). For example, an additive manufacturing process for forming the single-piece valve closure member 502 of FIGS. 5-8 may begin by forming one or more first layer(s) of material that define the sealing surface 506 and/or the face 508 of the single-piece valve closure member 502. The additive manufacturing process may next form one or more second layers(s) of material that define the integral flow path 604 (e.g., including the sealing-surface portion 728 and the face portion 730 of the integral flow path 604) within the single-piece valve closure member 502 adjacent the sealing surface 506 and adjacent the face 508 of the single-piece valve closure member 502. The additive manufacturing process may then continue forming one or more third layer(s) of material of the single-piece valve closure member 502 until fabrication of the single-piece valve closure member 502 is complete (e.g., when the formed single-piece valve closure member 502 fully matches a CAD rendering of the single-piece valve closure member 502). The formation of the third layer(s) of material defines the bore 510, the fluid inlet 736, and the fluid outlet 738 of the single-piece valve closure member 502 of FIGS. 5-8, each of which is integrally formed within the single-piece valve closure member 502 along with the integral flow path 604 via the additive manufacturing process. In some examples, the above-described additive manufacturing process for forming the single-piece valve closure member 502 of FIGS. 5-8 may be modified (e.g., reversed) such that the sealing surface 506 and/or the face 508 is/are the final components of the single-piece valve closure member 502 to be formed via the additive manufacturing process.

Figure 9:
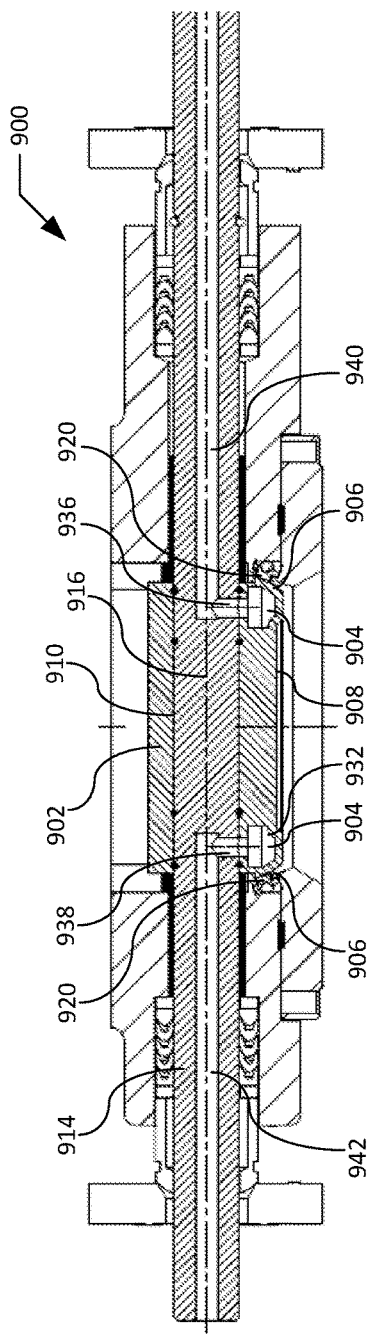
FIG. 9 is a cross-sectional view of a first example butterfly valve having a third example single-piece valve closure member including a third example integral flow path formed via an additive manufacturing process.
Figure 10:
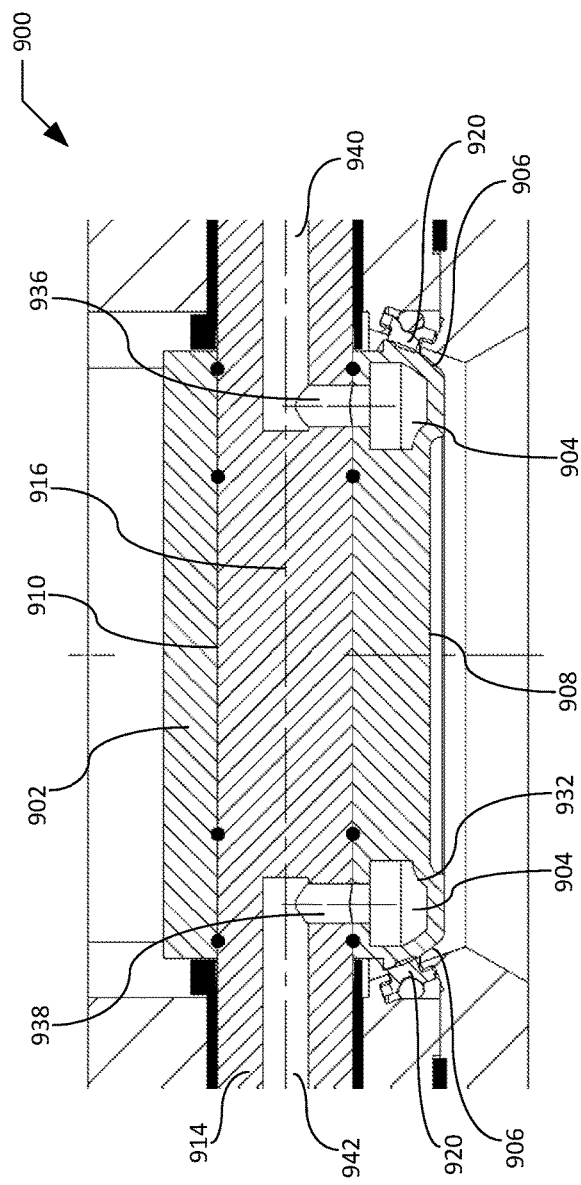
FIG. 10 is an enlarged cross-sectional view of the third example single-piece valve closure member of FIG. 9.

FIG. 9 is a cross-sectional view of a first example butterfly valve 900 having a third example single-piece valve closure member 902 including a third example integral flow path 904 formed via an additive manufacturing process. FIG. 10 is an enlarged cross-sectional view of the third example single-piece valve closure member 902 of FIG. 9.

As shown in FIGS. 9 and 10, the single-piece valve closure member 902 of the butterfly valve 900 includes an example sealing surface 906, an example face 908, and an example bore 910. The sealing surface 906 forms a perimeter around the face 908. The sealing surface 906 and/or the face 908 of the single-piece valve closure member 902 may be exposed to process fluid flowing through the butterfly valve 900. The bore 910 receives an example shaft 914 of the butterfly valve 900. The shaft 914 rotates about an example longitudinal axis 916 defined by the bore 910 to position the single-piece valve closure member 902 within the butterfly valve 900. When the single-piece valve closure member 902 is in a closed position, one or more portion(s) of the sealing surface 906 mate(s) with (e.g., forms a seal with) an example seat 920 of the valve.

As further shown in FIGS. 9 and 10, the integral flow path 904 of the single-piece valve closure member 902 is formed within the single-piece valve closure member 902 adjacent the sealing surface 906 of the single-piece valve closure member 902. In some examples, the integral flow path 904 of FIGS. 9 and 10 may trace and/or track the entirety of a profile of the sealing surface 906. In other examples, the integral flow path 904 of FIGS. 9 and 10 may trace and/or track one or more portion(s) of the profile of the sealing surface 906 without tracing and/or tracking the entirety of the profile of the sealing surface 906.

As further shown in FIGS. 9 and 10, the integral flow path 904 has an example cross-sectional area 932 formed such that portions of the integral flow path 904 are adjacent corresponding portions of the sealing surface 906 of the single-piece valve closure member 902. In some examples, the integral flow path 904 may have a cross-sectional area of a size, shape, orientation and/or configuration differing from the size, shape, orientation and/or configuration of the cross-sectional area 932 shown in FIGS. 9 and 10. For example, the integral flow path 904 may have a cross-sectional area that is circular, elliptical, triangular, rectangular, or irregular in shape. In some examples, the cross-sectional area of the integral flow path 904 may change (e.g., in size or shape) at different locations along the integral flow path 904.

As further shown in FIGS. 9 and 10, the integral flow path 904 is in fluid communication with an example fluid inlet 936 and an example fluid outlet 938, both of which are integrally formed within the single-piece valve closure member 902 via the additive manufacturing process. The fluid inlet 936 and the fluid outlet 938 may be of any size, shape, configuration and/or orientation, and may be positioned at any location relative to the integral flow path 904. In the illustrated example, the shaft 914 received in the bore 910 includes a first example flow path 940 in fluid communication with the fluid inlet 936, and a second example flow path 942 in fluid communication with the fluid outlet 938 of the single-piece valve closure member 902. A thermal fluid flowing through the first flow path 940 of the shaft 914 is received at the fluid inlet 936 of the single-piece valve closure member 902, circulated through the integral flow path 904 of the single-piece valve closure member 902, and exhausted and/or dispensed at the fluid outlet 938 to flow through the second flow path 942 of the shaft 914. As a result of the integral flow path 904 being formed adjacent the sealing surface 906 of the single-piece valve closure member 902, circulation of the thermal fluid through the integral flow path 904 of the single-piece valve closure member 902 may control a temperature of the sealing surface 906 of the single-piece valve closure member 902.

The third example single-piece valve closure member 902 of FIGS. 9 and 10 is formed and/or fabricated via one or more additive manufacturing process(es). For example, an additive manufacturing process for forming the single-piece valve closure member 902 of FIGS. 9 and 10 may begin by forming one or more first layer(s) of material that define the sealing surface 906 and/or the face 908 of the single-piece valve closure member 902. The additive manufacturing process may next form one or more second layers(s) of material that define the integral flow path 904 within the single-piece valve closure member 902 adjacent the sealing surface 906 of the single-piece valve closure member 902. The additive manufacturing process may then continue forming one or more third layer(s) of material of the single-piece valve closure member 902 until fabrication of the single-piece valve closure member 902 is complete (e.g., when the formed single-piece valve closure member 902 fully matches a CAD rendering of the single-piece valve closure member 902). The formation of the third layer(s) of material defines the bore 910, the fluid inlet 936, and the fluid outlet 938 of the single-piece valve closure member 902 of FIGS. 9 and 10, each of which is integrally formed within the single-piece valve closure member 902 along with the integral flow path 904 via the additive manufacturing process. In some examples, the above-described additive manufacturing process for forming the single-piece valve closure member 902 of FIGS. 9 and 10 may be modified (e.g., reversed) such that the sealing surface 906 and/or the face 908 is/are the final components of the single-piece valve closure member 902 to be formed via the additive manufacturing process.

FIG. 11 is a cross-sectional view of a second example butterfly valve 1100 having a fourth example single-piece valve closure member 1102 including a fourth example integral flow path 1104 formed via an additive manufacturing process. FIG. 12 is an enlarged cross-sectional view of the fourth example single-piece valve closure member 1102 of FIG. 11.

As shown in FIGS. 11 and 12, the single-piece valve closure member 1102 of the butterfly valve 1100 includes an example sealing surface 1106, an example face 1108, a first example bore 1110, and a second example bore 1112. The sealing surface 1106 forms a perimeter around the face 1108. The sealing surface 1106 and/or the face 1108 of the single-piece valve closure member 1102 may be exposed to process fluid flowing through the butterfly valve 1100. The first bore 1110 receives an example first shaft 1114 of the butterfly valve 1100. The first shaft 1114 rotates about an example longitudinal axis 1116 defined by the first bore 1110 to position the single-piece valve closure member 1102 within the butterfly valve 1100. Similarly, the second bore 1112 receives an example second shaft 1118 of the butterfly valve 1100. Like the first shaft 1114, the second shaft 1118 rotates about the longitudinal axis 1116 to position the single-piece valve closure member 1102 within the butterfly valve 1100. When the single-piece valve closure member 1102 is in a closed position, one or more portion(s) of the sealing surface 1106 mate(s) with (e.g., forms a seal with) an example seat 1120 of the valve.

As further shown in FIGS. 11 and 12, the integral flow path 1104 of the single-piece valve closure member 1102 is formed within the single-piece valve closure member 1102 adjacent the sealing surface 1106 and adjacent the face 1108 of the single-piece valve closure member 1102. In some examples, the integral flow path 1104 of FIGS. 11 and 12 may trace and/or track the entirety of a profile of the sealing surface 1106 and/or the entirety of a profile of the face 1108. In other examples, the integral flow path 1104 of FIGS. 1 and 12 may trace and/or track one or more portion(s) of the profile of the sealing surface 1106 and/or one or more portion(s) of the profile of the face 1108 without tracing and/or tracking the entirety of the profile of the sealing surface 1106 and/or the entirety of the profile of the face 1108.

As further shown in FIGS. 11 and 12, the integral flow path 1104 has an example sealing-surface portion 1128 and an example face portion 1130. The sealing-surface portion 1128 of the integral flow path 1104 has an example trapezoidal cross-sectional area 1132 formed such that portions of the integral flow path 1104 are adjacent corresponding portions of the sealing surface 1106 of the single-piece valve closure member 1102. The face portion 1130 of the integral flow path 1104 has an example rectangular cross-sectional area 1134 formed such that a portion of the integral flow path 1104 is adjacent a portion of the face 1108 of the single-piece valve closure member 1102. In some examples, the integral flow path 1104 may include one or more portion(s) having a cross-sectional area of a size, shape, orientation and/or configuration differing from the size, shape, orientation and/or configuration of the trapezoidal cross-sectional area 1132 of the sealing-surface portion 1128 and/or the rectangular cross-sectional area 1134 of the face portion 1130 shown in FIGS. 11 and 12. For example, the integral flow path 1104 may include a sealing-surface portion having cross-sectional area that is circular, elliptical, triangular, rectangular, or irregular in shape. As another example, the integral flow path 1104 may include a face portion having a cross-sectional area that is circular, elliptical, triangular, trapezoidal, or irregular in shape. In some examples, the cross-sectional area(s) of the integral flow path 1104 may change (e.g., in size or shape) at different locations along the integral flow path 1104.

As further shown in FIGS. 11 and 12, the integral flow path 1104 is in fluid communication with an example fluid inlet 1136 and an example fluid outlet 1138, both of which are integrally formed within the single-piece valve closure member 1102 via the additive manufacturing process. The fluid inlet 1136 and the fluid outlet 1138 may be of any size, shape, configuration and/or orientation, and may be positioned at any location relative to the integral flow path 1104. In the illustrated example, the first shaft 1114 received in the first bore 1110 includes a first example flow path 1140 in fluid communication with the fluid inlet 1136, and the second shaft 1118 received in the second bore 1112 includes a second example flow path 1142 in fluid communication with the fluid outlet 1138 of the single-piece valve closure member 1102. A thermal fluid flowing through the first flow path 1140 of the first shaft 1114 is received at the fluid inlet 1136 of the single-piece valve closure member 1102, circulated through the integral flow path 1104 of the single-piece valve closure member 1102, and exhausted and/or dispensed at the fluid outlet 1138 to flow through the second flow path 1142 of the second shaft 1118. As a result of the integral flow path 1104 being formed adjacent the sealing surface 1106 and the face 1108 of the single-piece valve closure member 1102, circulation of the thermal fluid through the integral flow path 1104 of the single-piece valve closure member 1102 may control a temperature of the sealing surface 1106 of the single-piece valve closure member 1102 and/or a temperature of the face 1108 of the single-piece valve closure member 1102.

The fourth example single-piece valve closure member 1102 of FIGS. 11 and 12 is formed and/or fabricated via one or more additive manufacturing process(es). For example, an additive manufacturing process for forming the single-piece valve closure member 1102 of FIGS. 11 and 12 may begin by forming one or more first layer(s) of material that define the sealing surface 1106 and/or the face 1108 of the single-piece valve closure member 1102. The additive manufacturing process may next form one or more second layers(s) of material that define the integral flow path 1104 (e.g., including the sealing-surface portion 1128 and the face portion 1130 of the integral flow path 1104) within the single-piece valve closure member 1102 adjacent the sealing surface 1106 and adjacent the face 1108 of the single-piece valve closure member 1102. The additive manufacturing process may then continue forming one or more third layer(s) of material of the single-piece valve closure member 1102 until fabrication of the single-piece valve closure member 1102 is complete (e.g., when the formed single-piece valve closure member 1102 fully matches a CAD rendering of the single-piece valve closure member 1102). The formation of the third layer(s) of material defines the first bore 1110, the second bore 1112, the fluid inlet 1136, and the fluid outlet 1138 of the single-piece valve closure member 1102 of FIGS. 11 and 12, each of which is integrally formed within the single-piece valve closure member 1102 along with the integral flow path 1104 via the additive manufacturing process. In some examples, the above-described additive manufacturing process for forming the single-piece valve closure member 1102 of FIGS. 11 and 12 may be modified (e.g., reversed) such that the sealing surface 1106 and/or the face 1108 is/are the final components of the single-piece valve closure member 1102 to be formed via the additive manufacturing process.

Figure 13:
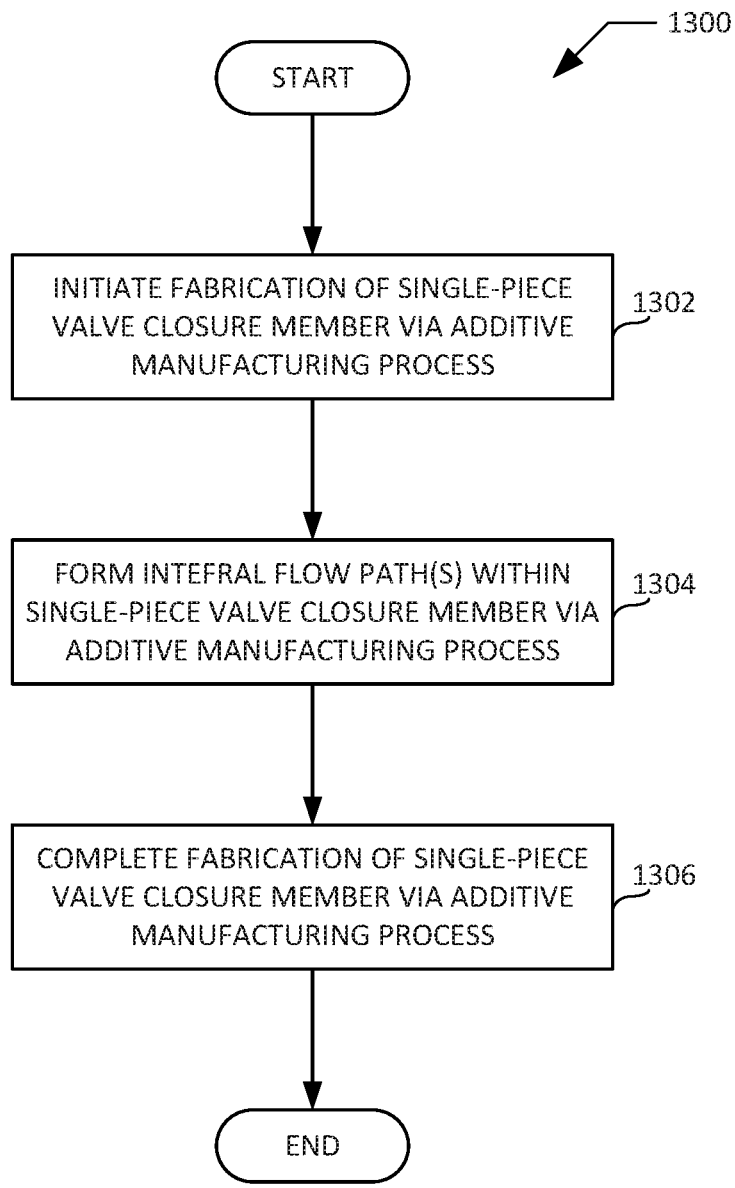
FIG. 13 is a flowchart representative of an example method for forming a single-piece valve closure member including an integral flow path via an additive manufacturing process.

FIG. 13 is a flowchart representative of an example method 1300 for forming a single-piece valve closure member including an integral flow path via an additive manufacturing process. The example method 1300 of FIG. 13 may be implemented to form any of the first, second, third or fourth example single-piece valve closure members 102, 502, 902, 1102 of FIGS. 1-12, including any of the corresponding first, second, third or fourth example integral flow paths 204, 604, 904, 1104 of FIGS. 2-4 and 6-12.

The example method 1300 of FIG. 13 begins with initiating fabrication of a single-piece valve closure member via an additive manufacturing process (block 1302). For example, the additive manufacturing process may form one or more first layer(s) of material that define a sealing surface and/or a face of the single-piece valve closure member. Following block 1302, the example method 1300 of FIG. 13 proceeds to block 1304.

The example method 1300 of FIG. 13 includes forming one or more integral flow path(s) within the single-piece valve closure member via the additive manufacturing process (block 1304). For example, the additive manufacturing process may form one or more second layers(s) of material that define an integral flow path within the single-piece valve closure member adjacent a sealing surface and/or a face formed at block 1302 of the example method 1300. Following block 1304, the example method 1300 of FIG. 13 proceeds to block 1306.

The example method 1300 of FIG. 13 includes completing fabrication of the single-piece valve closure member via the additive manufacturing process (block 1306). For example, the additive manufacturing process may continue forming one or more third layer(s) of material of the single-piece valve closure member until fabrication of the single-piece valve closure member is complete (e.g., when the formed single-piece valve closure member fully matches a CAD rendering of the single-piece valve closure member). In some examples, the formation of the third layer(s) of material may define one or more fluid inlet(s) in fluid communication with the one or more integral flow path(s) formed at block 1304 of the example method 1300, one or more fluid outlet(s) in fluid communication with the one or more integral flow path(s) formed at block 1304 of the example method 1300, and/or one or more bore(s) to receive one or more shaft(s) configured to position the single-piece valve closure member within a valve relative to a seat of the valve. Following block 1306, the example method 1300 of FIG. 13 ends.

From the foregoing, it will be appreciated that the disclosed single-piece valve closure members including integral flow paths formed via additive manufacturing processes provide numerous advantages over conventional multi-piece steam-traced valve closure members. For example, additive manufacturing of the disclosed single-piece valve closure members eliminates the joints present in conventional multi-piece steam-traced valve closure members, and accordingly eliminates the risk of leak formation attributable to failure to properly seal such joints. As a result of joint welds and/or joint seals being eliminated, the disclosed single-piece valve closure members have outer geometries that are not altered or modified relative to those of corresponding ones of standard valve closure members (e.g., a valve closure member of the same size and shape that is not of the steam-traced variety). Therefore, the flow characteristics of the disclosed single-piece valve closure members are substantially identical to those of corresponding ones of standard valve closure members.

Additive manufacturing of the disclosed single-piece valve closure members advantageously enables unrestricted integral flow path and/or integral flow cavity geometry that can be optimized for application-specific heating or cooling characteristics. For example, one or more integral flow paths and/or integral flow cavities of the single-piece valve closure member can be fabricated to closely follow any surface of the valve closure member where heating or cooling is desirable (e.g., a sealing surface of the valve closure member, a face of the valve closure member, etc.). In this regard, additive manufacturing enables the integral formation of complex flow path and/or flow cavity geometries within a valve closure member that would be prohibitively difficult, if not impossible, to form via conventional multi-piece fabrication processes.

The aforementioned advantages and/or benefits are achieved via the disclosed single-piece valve closure members including integral flow paths formed via additive manufacturing processes. Apparatus comprising single-piece valve closure members (e.g., discs, plugs, balls, etc.) including integral flow paths formed via additive manufacturing processes are disclosed. In some disclosed examples, an apparatus comprises a single-piece valve closure member. In some disclosed examples, the single-piece valve closure member includes an integral flow path to direct a flow of fluid within the valve closure member. In some disclosed examples, the valve closure member comprises one of a disc, a plug, or a ball.

In some disclosed examples of the apparatus, the integral flow path of the valve closure member is adjacent a sealing surface of the valve closure member. In some disclosed examples, the integral flow path is to receive a thermal fluid to control a temperature of the sealing surface.

In some disclosed examples of the apparatus, the integral flow path of the valve closure member is adjacent a face of the valve closure member. In some disclosed examples, the integral flow path is to receive a thermal fluid to control a temperature of the face. In some disclosed examples, the integral flow path is also adjacent a sealing surface of the valve closure member. In some disclosed examples, the thermal fluid is to further control a temperature of the sealing surface.

Methods for forming single-piece valve closure members (e.g., discs, plugs, balls, etc.) including integral flow paths formed via additive manufacturing processes are also disclosed. In some disclosed examples, a method comprises forming, via an additive manufacturing process, a single-piece valve closure member. In some disclosed examples, the single-piece valve closure member includes an integral flow path to direct a flow of fluid within the valve closure member. In some disclosed examples, the valve closure member comprises one of a disc, a plug, or a ball.

In some disclosed examples of the method, the integral flow path of the valve closure member is formed adjacent a sealing surface of the valve closure member. In some disclosed examples, the integral flow path is to receive a thermal fluid to control a temperature of the sealing surface.

In some disclosed examples of the method, the integral flow path of the valve closure member is formed adjacent a face of the valve closure member. In some disclosed examples, the integral flow path is to receive a thermal fluid to control a temperature of the face. In some disclosed examples, the integral flow path is further formed adjacent a sealing surface of the valve closure member. In some disclosed examples, the thermal fluid is to further control a temperature of the sealing surface.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. An apparatus, comprising:
a single-piece valve closure member including a fluid inlet, a fluid outlet, and an integral flow path in fluid communication with the fluid inlet and the fluid outlet, the fluid inlet being parallel to the fluid outlet, the flow path extending transversely from the fluid inlet to the fluid outlet, the flow path being adjacent a sealing surface of the valve closure member and tracing a circular-shaped profile of the sealing surface, the flow path being configured to receive a fluid from the fluid inlet, circulate the fluid through the flow path, and exhaust the fluid via the fluid outlet, the flow path being parallel to a bore formed in the valve closure member, the bore defining a longitudinal axis and being configured to receive a shaft, the shaft to rotate about the longitudinal axis to position the valve closure member relative to a valve seat.

2. The apparatus of claim 1, wherein the valve closure member comprises one of a disc, a plug, or a ball.

3. The apparatus of claim 1, wherein the fluid is a thermal fluid to control a temperature of the sealing surface.

4. The apparatus of claim 1, wherein the flow path traces the entirety of the circular-shaped profile of the sealing surface.

5. The apparatus of claim 1, wherein the sealing surface is to mate with the valve seat when the valve closure member is in a closed position.

6. The apparatus of claim 1, wherein the flow path is also adjacent a face of the valve closure member, the flow path tracing a circular-shaped profile of the face, the circular-shaped profile of the sealing surface being concentric with the circular-shaped profile of the face.

7. The apparatus of claim 6, wherein the fluid is a thermal fluid to control a temperature of the sealing surface and a temperature of the face.

8. The apparatus of claim 6, wherein the flow path traces the entirety of the circular-shaped profile of the sealing surface, and wherein the flow path also traces the entirety of the circular-shaped profile of the face.

9. The apparatus of claim 8, wherein the flow path includes a sealing surface portion and a face portion, the sealing surface portion having a trapezoidal cross-sectional area, the face portion having a rectangular cross-sectional area.

10. A method, comprising:
forming, via an additive manufacturing process, a single-piece valve closure member including a fluid inlet, a fluid outlet, and an integral flow path in fluid communication with the fluid inlet and the fluid outlet, the fluid inlet being parallel to the fluid outlet, the flow path extending transversely from the fluid inlet to the fluid outlet, the flow path being adjacent a sealing surface of the valve closure member and tracing a circular-shaped profile of the sealing surface, the flow path being configured to receive a fluid from the fluid inlet, circulate the fluid through the flow path, and exhaust the fluid via the fluid outlet, the flow path being parallel to a bore formed in the valve closure member, the bore defining a longitudinal axis and being configured to receive a shaft, the shaft to rotate about the longitudinal axis to position the valve closure member relative to a valve seat.

11. The method of claim 10, wherein the valve closure member comprises one of a disc, a plug, or a ball.

12. The method of claim 10, wherein the fluid is a thermal fluid to control a temperature of the sealing surface.

13. The method of claim 10, wherein the flow path is also formed adjacent a face of the valve closure member, the flow path tracing a circular-shaped profile of the face, the circular-shaped profile of the sealing surface being concentric with the circular-shaped profile of the face.

14. The method of claim 13, wherein the fluid is a thermal fluid to control a temperature of the sealing surface and a temperature of the face.

15. The method of claim 13, wherein the flow path traces the entirety of the circular-shaped profile of the sealing surface, and wherein the flow path also traces the entirety of the circular-shaped profile of the face.

16. An apparatus, comprising:
a single-piece valve disc including a fluid inlet, a fluid outlet, and an integral flow path in fluid communication with the fluid inlet and the fluid outlet, the fluid inlet being parallel to the fluid outlet, the flow path extending transversely from the fluid inlet to the fluid outlet, the flow path being adjacent a sealing surface of the valve disc and tracing a circular-shaped profile of the sealing surface, the flow path being configured to receive a fluid from the fluid inlet, circulate the fluid through the flow path, and exhaust the fluid via the fluid outlet, the flow path being parallel to a bore formed in the valve disc, the bore defining a longitudinal axis and being configured to receive a shaft, the shaft to rotate about the longitudinal axis to position the valve disc relative to a valve seat.

17. The apparatus of claim 16, wherein the fluid is a thermal fluid to control a temperature of the sealing surface.

18. The apparatus of claim 16, wherein the flow path is also adjacent a face of the valve disc, the flow path tracing a circular-shaped profile of the face, the circular-shaped profile of the sealing surface being concentric with the circular-shaped profile of the face.

19. The apparatus of claim 18, wherein the fluid is a thermal fluid to control a temperature of the sealing surface and a temperature of the face.

20. The apparatus of claim 18, wherein the flow path traces the entirety of the circular-shaped profile of the sealing surface, and wherein the flow path also traces the entirety of the circular-shaped profile of the face.

* * * * *